United States Patent
Yu et al.

(10) Patent No.: US 9,471,544 B1
(45) Date of Patent: Oct. 18, 2016

(54) ANOMALY DETECTION IN A SIGNAL

(75) Inventors: Kevin Yu, Palo Alto, CA (US); Xinyi Zhang, San Jose, CA (US)

(73) Assignee: Google Inc., Mountain View, CA (US)

( * ) Notice: Subject to any disclaimer, the term of this patent is extended or adjusted under 35 U.S.C. 154(b) by 976 days.

(21) Appl. No.: 13/480,042

(22) Filed: May 24, 2012

(51) Int. Cl.
*G06F 17/18* (2006.01)

(52) U.S. Cl.
CPC ..................... *G06F 17/18* (2013.01)

(58) Field of Classification Search
CPC ....................................................... G06F 17/18
USPC ................................................ 702/181–183
See application file for complete search history.

(56) References Cited

U.S. PATENT DOCUMENTS

| | | | |
|---|---|---|---|
| 4,291,269 A | 9/1981 | Nossen | |
| 6,625,569 B2 | 9/2003 | James et al. | |
| 6,877,043 B2 | 4/2005 | Mallory et al. | |
| 7,080,290 B2 | 7/2006 | James et al. | |
| 7,523,016 B1 | 4/2009 | Surdulescu et al. | |
| 7,620,868 B2 | 11/2009 | Tailliet et al. | |
| 7,716,011 B2 | 5/2010 | Thibaux et al. | |
| 7,802,165 B2 | 9/2010 | Jain et al. | |
| 7,869,544 B2 | 1/2011 | Sorna et al. | |
| 8,090,592 B1 | 1/2012 | Goodall et al. | |
| 8,504,882 B2 | 8/2013 | Li et al. | |
| 8,806,313 B1 | 8/2014 | Yu et al. | |
| 8,868,993 B1 | 10/2014 | Yu et al. | |
| 8,949,677 B1 | 2/2015 | Brundage et al. | |
| 8,954,361 B1 | 2/2015 | Phillips et al. | |
| 2002/0055826 A1* | 5/2002 | Wegerich et al. | ............... 703/2 |
| 2003/0126289 A1 | 7/2003 | Aggarwal et al. | |
| 2005/0220030 A1 | 10/2005 | Nagami et al. | |
| 2005/0234667 A1 | 10/2005 | Hilton | |
| 2008/0052784 A1 | 2/2008 | Wiley et al. | |
| 2008/0271038 A1 | 10/2008 | Rolia et al. | |
| 2009/0017758 A1 | 1/2009 | Dorneich et al. | |
| 2009/0018798 A1 | 1/2009 | Dorneich et al. | |
| 2010/0023282 A1* | 1/2010 | Lewis et al. | ................... 702/57 |
| 2010/0027432 A1 | 2/2010 | Gopalan et al. | |
| 2010/0071061 A1 | 3/2010 | Crovella et al. | |
| 2010/0106752 A1 | 4/2010 | Eckardt et al. | |
| 2011/0119374 A1 | 5/2011 | Ruhl et al. | |
| 2011/0173015 A1 | 7/2011 | Chapman et al. | |
| 2011/0276887 A1 | 11/2011 | Cohen et al. | |
| 2012/0140671 A1 | 6/2012 | Bukofser et al. | |
| 2013/0085715 A1 | 4/2013 | Lakshminarayan et al. | |
| 2013/0173215 A1 | 7/2013 | Patankar et al. | |
| 2014/0172382 A1 | 6/2014 | Andrews et al. | |

OTHER PUBLICATIONS

U.S. Appl. No. 13/480,042, filed May 24, 2012, Google Inc.
U.S. Appl. No. 13/488,875, filed Jun. 5, 2012, Google Inc.

(Continued)

*Primary Examiner* — Ricky Ngon
(74) *Attorney, Agent, or Firm* — McDermott Will & Emery LLP (57) ABSTRACT

Systems and methods are disclosed herein for detecting an anomaly in a discrete signal, where a long-term trend of the discrete signal is identified. Samples in the signal correspond to a number of data packets arriving at a location in a network within a time interval. The long-term trend is subtracted from the discrete signal to obtain a detrended signal. A cyclic pattern is identified in the detrended signal and is subtracted from the detrended signal to obtain a residual signal. Anomaly detection is performed on the residual signal.

18 Claims, 6 Drawing Sheets

(56) References Cited

OTHER PUBLICATIONS

Bandara, Vidarshana W. et al., "Extracting Baseline Patterns in Internet Traffic Using Robust Principal Components", 2011, 36$^{th}$ Annual IEEE Conference on Local Computer Networks, IEEE.

Bosco, Bruno, et al, "A Robust Multivariate Long Run Analysis of European Electricity Prices," Nota di Lavoro, vol. 103, Sep. 2007, 29 pages.

Chen, Thomas M., "Network Traffic Modeling," The Handbook of Computer Networks, Hossein Bidgoli (ed.), Wiley, to appear 2007, 29 pages.

Du, Ping et al., "Detecting and Tracing Traffic Volume Anomalies in SINET3 Backbone Network", 2008, IEEE Communications Society, IEEE.

Escribano, Alvaro, et al.,"Modeling Electricity Prices: International Evidence," Working Paper 02-27, Economics Series 08, Departamento de Economia, Universidad Carlos III de Madrid, Spain, Jun. 2002, 32 pages.

Harvey, Andrew C., et al., "Trends and Cycles in Economic Time Series: A Bayesian Approach," Journal of Econometrics, vol. 140, 2007, pp. 618-649.

Hellerstein, Joseph M., "Quantitative Data Cleaning for Large Databases", Feb. 27, 2008, United Nations Economic Commision for Europe.

Huiqi Zhang, et al., "Change Point Detection based on Call Detail Records", IEEE, pp. 55-60, Jun. 8-9, 2011.

Jensen, Kare Jean, "Signal Processing for Distribution Network Monitoring." PhD Thesis, Technical University of Denmark, Department of Informatics and Mathematical Modeling, 1999, 219 pages.

Mahmoud A. Mahmoud et al., "A Change Point Method for Linear Profile Data", Quality and Reliability Engineering International, vol. 23, pp. 247-268, 2007.

Malliga, S. et al., "Filtering Spoofed Traffic at Source End for Defending Against DoS/DDoS Attacks", 2008, Proceedings of the 2008 International Conference on Computing, Communication and Networking, IEEE.

US Advisory Action U.S. Appl. No. 13/446,842 DTD Oct. 2, 2015.
US Notice of Allowance in U.S. Appl. No. 13/480,084 DTD Apr. 10, 2014.
US Office Action in U.S. Appl. No. 13/446,842 DTD Feb. 11, 2015.
US Office Action in U.S. Appl. No. 13/446,842 DTD Aug. 26, 2014.
US Office Action in U.S. Appl. No. 13/480,084 DTD Nov. 5, 2013.
US Office Action in U.S. Appl. No. 13/480,124 DTD Aug. 12, 2014.
US Office Action in U.S. Appl. No. 13/483,601 DTD Jan. 16, 2015.
US Office Action in U.S. Appl. No. 13/488,875 DTD Aug. 26, 2014.
US Office Action in U.S. Appl. No. 13/826,994 DTD Jul. 7, 2015.
US Office Action in U.S. Appl. No. 13/827,144 DTD Jul. 27, 2015.
US Office Action in U.S. Appl. No. 13/251,080 dated Jul. 11, 2014.
US Office Action U.S. Appl. No. 13/446,842 DTD Jun. 22, 2015.
Zhang, Michael, et al, "A Nonlinear Autoregressive Conditional Duration Model with Applications to Financial Transaction Data" Graduate School of Business, University of Chicago, Jul. 1999, 53 pages.

Patcha, A. et al. An overview of anomaly detection techniques: existing solutions and latest technological trends', Computer Networks, vol. 51, Issue 12, pp. 3448-70, Aug. 22, 2007.

US Office Action on U.S. Appl. No. 13/569,688 DTD Jan. 14, 2016.
US Office Action on U.S. Appl. No. 13/826,994 DTD Dec. 22, 2015.
U.S. Appl. No. 13/569,688, filed Aug. 8, 2012.
U.S. Appl. No. 13/480,084, filed May 24, 2012.
U.S. Appl. No. 13/446,842, filed Apr. 13, 2012.
U.S. Appl. No. 13/480,124, filed May 24, 2012.
U.S. Appl. No. 13/483,601, filed May 30, 2012.
U.S. Appl. No. 13/488,875, filed Jun. 5, 2012.
U.S. Appl. No. 13/827,144, filed Mar. 14, 2013.
U.S. Appl. No. 13/826,994, filed Mar. 14, 2013.

Chen, Thomas M. "Network Traffic Modeling" 2007, The Handbook of Computer Networks.

Listanti, Marco et al. "Architectural and Technological Issues for Future Optical Internet Networks", IEEE Communications Magazine, Sep. 2000.

US Office Action on U.S. Appl. No. 13/446,842 DTD May 5, 2016.
US Office Action on U.S. Appl. No. 13/827,144 DTD Mar. 7, 2016.

\* cited by examiner

ANOMALY DETECTION IN A SIGNAL

TECHNICAL FIELD

The systems and methods described herein relate to data analysis, and particularly, to detecting an anomaly in a signal.

BACKGROUND

Many signals derived from real world systems exhibit relatively long-term, slow-changing trends. Sometimes a signal also includes cyclic patterns at different time scales. The trends and cyclic patterns are often hidden by faster changing noise or other signal artifacts. Traditional anomaly detection algorithms typically do not distinguish between long-term trends, cyclic patterns, and residual components. In particular, traditional anomaly detection algorithms often lead to false alarms and undetected anomalies because the long-term trends and/or cyclic patterns interfere with the algorithms. Interfering with anomaly detection algorithms often leads to false alarms and undetected anomalies.

Systems and methods to detect anomalies while accounting for long-term trends and cyclic patterns would therefore be of great benefit in data analysis.

SUMMARY

Accordingly, the systems and methods described herein include, among other things, providing detection of an anomaly in a discrete signal. Samples in the signal correspond to amounts of data flow in a network within a time interval. The method describes receiving a discrete signal and identifying a trend corresponding to long-term fluctuations of the discrete signal. The trend is subtracted from the discrete signal to obtain a detrended signal. A cyclic pattern is identified in the detrended signal and is subtracted from the detrended signal to obtain a residual signal. Anomaly detection is performed on the residual signal.

In one embodiment, the anomaly corresponds to an amount of data flow larger than a threshold.

In one embodiment, detecting an anomaly comprises using a statistics-based anomaly detection algorithm. The statistics-based anomaly detection algorithm comprises identifying a characteristic range of a plurality of samples in the residual signal, wherein at least a portion of the plurality of samples in the signal are within the characteristic range, and identifying a sample in the residual signal outside the characteristic range as an anomaly.

In one embodiment, identifying an anomaly comprises using an amplitude-based anomaly detection algorithm. The amplitude-based anomaly detection algorithm comprises generating a historical probability distribution of the residual signal based on previously received samples and computing a likelihood for each sample in a plurality of samples in the residual signal based at least in part on the historical probability distribution. The algorithm further comprises selecting a likelihood threshold, and identifying a set of consecutive samples as an anomaly, wherein each sample in the set has a computed likelihood below the likelihood threshold.

In one embodiment, identifying the long-term trend in the discrete signal comprises selecting a parameter L, wherein L corresponds to a minimum number of samples in a trend and appending L consecutive samples of the discrete signal to a buffer. One of the samples in the buffer is iteratively selected, a first curve is fit to samples in the buffer preceding the selected sample, a second curve is fit to samples in the buffer following the selected sample, and a probability that the selected sample is a trend change point is computed based on a deviation between the samples in the buffer and the fitted first and second curves. Based at least in part on the computed probabilities, it is determined whether there is a trend change point in the buffer based, and a sample in the buffer is identified as a trend change point.

In one embodiment, identifying the long-term trend in the discrete signal comprises subdividing the discrete signal into a plurality of signal components, wherein each signal component is associated with a range of frequencies. A cut-off frequency is selected for identifying a trend component in the discrete signal, and one of the signal components in the plurality of signal components is iteratively selected. The selected signal component is identified as a trend component based on a comparison between the cut-off frequency and an identified frequency associated with the signal component, and a trend is determined based at least in part on a sum of identified trend components.

In one embodiment, identifying the cyclic pattern in the detrended signal comprises providing a period of the cyclic pattern and identifying an index for each sample in a plurality of samples in the signal. A plurality of subsets of samples is formed, wherein each subset is associated with a remainder value less than the period. Each sample in the plurality of samples to a subset is sorted based on a remainder of the sample index divided by the period, and a value associated with each subset is computed. The cyclic pattern is determined by ordering the computed values according to the associated remainder values.

According to another aspect, the systems and methods described herein relate to an apparatus to carry out the methods described above. In particular, an apparatus is described for detecting anomalies in a discrete signal. Samples in the discrete signal correspond to amounts of data flow in a network within a time interval. The apparatus comprises a non-transitory memory and a processor for receiving the discrete signal, identifying a trend, corresponding to long-term fluctuations in the signal, in the discrete signal, and subtracting the trend from the signal to obtain a detrended signal. A cyclic pattern is identified in the detrended signal, and the cyclic pattern is subtracted from the detrended signal to obtain a residual signal. An anomaly is detected in the residual signal.

In one embodiment, the anomaly corresponds to an amount of data flow larger than a threshold.

In one embodiment, detecting an anomaly comprises using a statistics-based anomaly detection algorithm. The statistics-based anomaly detection algorithm comprises identifying a characteristic range of a plurality of samples in the residual signal, wherein at least a portion of the plurality of samples in the signal are within the characteristic range, and identifying a sample in the residual signal outside the characteristic range as an anomaly.

In one embodiment, identifying an anomaly comprises using an amplitude-based anomaly detection algorithm. The amplitude-based anomaly detection algorithm comprises generating a historical probability distribution of the residual signal based on previously received samples and computing a likelihood for each sample in a plurality of samples in the residual signal based at least in part on the historical probability distribution. The algorithm further comprises selecting a likelihood threshold, and identifying a set of consecutive samples as an anomaly, wherein each sample in the set has a computed likelihood below the likelihood threshold.

In one embodiment, identifying the long-term trend in the discrete signal comprises selecting a parameter L, wherein L corresponds to a minimum number of samples in a trend and appending L consecutive samples of the discrete signal to a buffer. One of the samples in the buffer is iteratively selected, a first curve is fit to samples in the buffer preceding the selected sample, a second curve is fit to samples in the buffer following the selected sample, and a probability that the selected sample is a trend change point is computed based on a deviation between the samples in the buffer and the fitted first and second curves. Based at least in part on the computed probabilities, it is determined whether there is a trend change point in the buffer based, and a sample in the buffer is identified as a trend change point.

In one embodiment, identifying the long-term trend in the discrete signal comprises subdividing the discrete signal into a plurality of signal components, wherein each signal component is associated with a range of frequencies. A cut-off frequency is selected for identifying a trend component in the discrete signal, and one of the signal components in the plurality of signal components is iteratively selected. The selected signal component is identified as a trend component based on a comparison between the cut-off frequency and an identified frequency associated with the signal component, and a trend is determined based at least in part on a sum of identified trend components.

In one embodiment, identifying the cyclic pattern in the detrended signal comprises providing a period of the cyclic pattern and identifying an index for each sample in a plurality of samples in the signal. A plurality of subsets of samples is formed, wherein each subset is associated with a remainder value less than the period. Each sample in the plurality of samples to a subset is sorted based on a remainder of the sample index divided by the period, and a value associated with each subset is computed. The cyclic pattern is determined by ordering the computed values according to the associated remainder values.

BRIEF DESCRIPTION

The systems and methods described herein are set forth in the appended claims. However, for the purpose of explanation, several embodiments are set forth in the following figures.

DETAILED DESCRIPTION OF CERTAIN ILLUSTRATIVE EMBODIMENTS

To provide an overall understanding of the disclosure, certain illustrative embodiments will now be described, including a system for detecting an anomaly in a signal. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
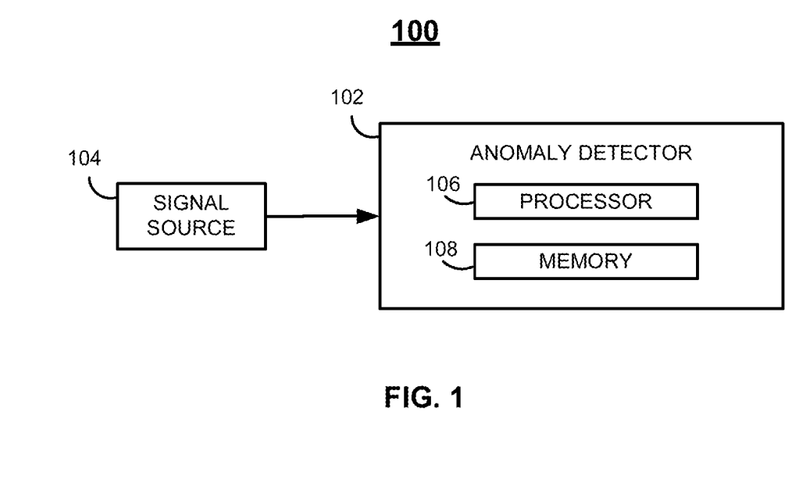
FIG. 1 illustrates one embodiment of a system for detecting an anomaly in a signal.

FIG. 1 illustrates one embodiment of a system 100 for detecting an anomaly in a signal. The system 100 includes a signal source 104 and an anomaly detector 102 including a processor 106 and a memory unit 108.

The signal source 104 provides a signal to the anomaly detector 102, and can be any source of a signal. The signal may be a discretized version of a continuous signal. As an example, the signal source 104 may include a device that monitors an amount of traffic flow in a network, and the signal may be a vector of discrete samples corresponding to an amount of traffic flow in the network as a function of time. In an example, the signal may correspond to a number of data packets arriving at a particular node in the network in a given time window. The signal source 104 may further be configured to process the signal to get the signal into a desired form, such as by controlling the amplitude of the signal or adjusting other characteristics of the signal. For example, the signal source 104 may quantize the signal, filter the signal, or perform any number of processing techniques on the signal. In general, any signal source may be used, and any form of processing may be performed by the signal source 104 before providing a signal to the anomaly detector 102.

The anomaly detector 102 is a device that detects an anomaly in the signal provided by the signal source 104. The anomaly detector 102 uses signal modeling to obtain an estimate of a long-term trend and a cyclic pattern in the signal. In particular, a trend corresponds to long-term fluctuations in the signal and can be linear, nonlinear, or even a combination of linear and nonlinear trends. In addition, any number of linear and/or nonlinear trends may be used to identify the long-term trend. A cyclic pattern corresponds to a periodic feature of the signal that is a repetitive pattern in the signal. Any number of periodic features (e.g., estimated at different time scales) may be used to identify the cyclic pattern.

In addition, an estimate of any sort of pattern in the signal may be used. For example, the anomaly detector 102 may use any subset or any combination of estimates of a linear trend, a nonlinear trend, and a cyclic pattern. Any additional estimates may also be used, such as multiple linear trends, nonlinear trends, or cyclic patterns estimated at different time scales, for example. For clarity, the remainder of this disclosure refers to identifying and removing a long-term trend and a cyclic pattern from a signal to derive a residual signal. The residual signal includes fast changing fluctuations and may be modeled as a zero mean stochastic process. The anomaly detector 102 identifies anomalies in the residual signal Identifying anomalies in a signal is useful for many reasons. For example, the signal received from the signal source 104 may represent an amount of data traffic activity in a network. Network traffic is often bursty, meaning the signal includes unexpected and unpredictable bursts in activity. Identifying these bursts is important for characterizing activity levels in the network. In an example, if a large number of traffic bursts occurs at a specific location in a network, causing long latencies and poor network performance, one or more components at the network location may need to be replaced. For example, buffers that temporarily store incoming data at the network location may need to be replaced with larger buffers, which are better equipped to handle large amounts of data. Network traffic is just one example of where detection of anomalies may be useful. In general, anomaly detection is useful in a number of fields and may often lead to improved systems in multiple applications.

The anomaly detector 102 includes a processor 106 and a memory unit 108. As used herein, the term "processor" or "computing device" refers to one or more computers, microprocessors, logic devices, servers, or other devices configured with hardware, firmware, and software to carry out one or more of the techniques described herein. An illustrative computing device 6, which may be used to implement any of the processors described herein, is described in detail below with reference to FIG. 6. The memory unit 108 is configured to store input data, output data, and data currently being processed by the processor 106.

Any suitable variation of system 100 may be used to detect an anomaly in a signal. For example, additional processors or memory units may be used to process or store data. In addition, the processor 106 may include a memory unit to store any or all of the data used during processing. In another example, the anomaly detector 102 may be included within the same device as the signal source 104. However, for ease of discussion, the remainder of this disclosure will describe detecting a trend change point in a signal with reference to the system 100 of FIG. 1.

Figure 2:
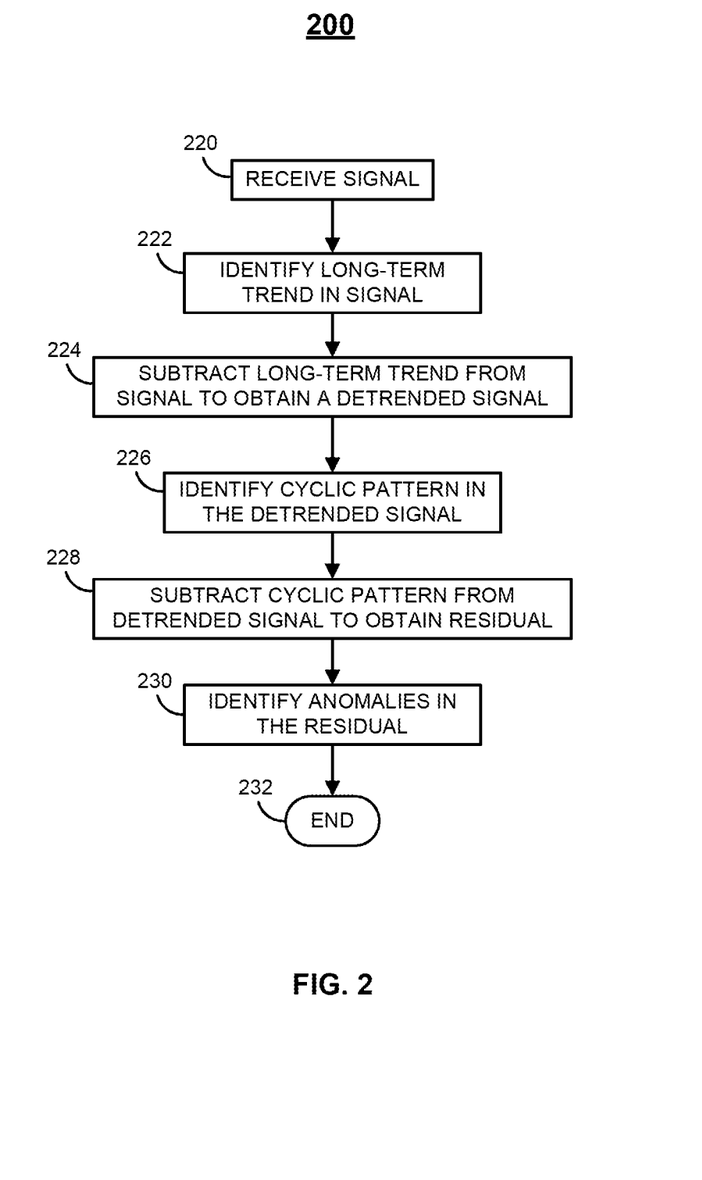
FIG. 2 is a flow chart of one illustrative method for detecting an anomaly in a signal.

FIG. 2 is a flow chart of one illustrative method 200 used by the processor 106 for detecting an anomaly in a signal. The illustrated method 200 includes the use of a signal model to identify and remove various patterns in a signal. The residual signal is then used for anomaly detection. By first removing patterns in the signal before performing anomaly detection, the method 200 is advantageous by decreasing the number of errors (false alarms and missed anomalies).

The depicted method 200 includes the steps of receiving a signal (step 220), identifying a long-term trend in the signal (step 222), and subtracting the long-term trend from the signal to obtain a detrended signal (step 224). A cyclic pattern is then also identified from the detrended signal and subtracted from the detrended signal (steps 226 and 228, respectively), and anomaly detection is performed on the residual signal (step 230).

First, at step 220, the processor 106 receives a signal from the signal source 104. As described in relation to FIG. 1, the signal may be representative of an amount of traffic flow in a network, such as a number of data packets that arrive at a location within a particular time window. In other applications, the signal may be representative of other events or values.

At step 222, the processor 106 identifies a long-term trend of the signal. The trend may include linear or nonlinear components. In general, a trend (linear or nonlinear) includes long-term and slow changes, such that the energy in a trend component is mostly concentrated near lower frequencies than other components in the signal. The method 200 may use the methods depicted in FIGS. 3 and 4 to identify a linear and/or nonlinear trend component, respectively.

Determination of a linear trend is described in detail in U.S. patent application Ser. No. 13/446,842, which is incorporated herein in entirety by reference. Determining a linear trend component of a signal may first include detecting trend change points in a signal, corresponding to points in a signal where the underlying distribution changes. Bayesian methods and maximum likelihood techniques may be used to detect trend change points in the signal. For example, a number of consecutive samples of the signal may be appended to a buffer, and Bayesian methods are used to determine which, if any, sample in the buffer corresponds to a trend change point. In addition, the processor 106 may identify multiple linear trends at different time scales by repeating the above analysis using different values for the number of consecutive samples appended to the buffer, for example.

Determination of a nonlinear trend is described in detail in U.S. patent application Ser. No. 13/483,601, which is incorporated herein in entirety by reference. Determining a nonlinear trend component of a signal may first include decomposing the signal into multiple components. The signal decomposition may be performed in a number of ways, such as using empirical mode decomposition. Components may be determined to be trend or noise components based on a comparison between a frequency in the component and a cut-off frequency. In addition, the processor 106 may identify multiple nonlinear trends at different time scales by repeating the above analysis using different values for the cut-off frequency, for example.

The identified trend may include any number of linear trends and any number of nonlinear trends. The identified trend may be chosen to be any combination of linear and nonlinear trends that minimizes an error, for example.

At step 224, the identified trend is subtracted from the signal to obtain a detrended signal.

At step 226, the processor 106 identifies a cyclic pattern in the detrended signal. Typically, a cyclic pattern includes faster fluctuations than a trend, such that the energy in a cyclic pattern is mostly concentrated near higher frequencies than the trend. The cyclic pattern is representative of a periodic feature repeated throughout a portion of the signal. The method 200 may use the method depicted in FIG. 5 to identify a cyclic pattern in the detrended signal.

Determination of a cyclic component of a signal is described in detail in U.S. patent application Ser. No. 13/488,875, which is incorporated herein in entirety by reference. Determining the cyclic pattern may include first identifying a period of interest and segmenting the signal based on the identified period. The resulting segments may then be superimposed, thus building a point-by-point model of the cyclic pattern. In addition, the processor 106 may identify multiple cyclic components at different time scales by repeating the above analysis using different values for the period, for example, and the identified cyclic pattern may include any number of cyclic components.

At step 228, the cyclic pattern is subtracted from the detrended signal to obtain a residual signal. Typically, the energy in the residual signal is mostly concentrated near higher frequencies than the cyclic pattern or the trend because the residual signal is representative of a noisy portion of the signal.

At step 230, the processor 106 identifies anomalies in the residual signal after the identified trend and the identified cyclic pattern are both subtracted from the signal. Anomaly detection in a signal such as the residual signal may be performed using an amplitude based algorithm or a statistics based algorithm, or a combination of both. Amplitude based anomaly detection in a signal is described in detail in U.S. patent application Ser. No. 13/480,084, which is incorporated herein in entirety by reference. In amplitude based algorithms, "soft computing" methods may be used, such as computing a likelihood value for each sample in a signal. In an example, these likelihood values are compared to a threshold likelihood value. The likelihood value may be computed based on an estimate of the probability distribution of a signal. Determination of an estimate of the probability distribution of a set of data is described in detail in U.S. patent application Ser. No. 13/480,124, which is incorporated herein in entirety by reference. An anomaly may be identified when a set of consecutive samples in the signal each have likelihood values below the threshold.

Statistics based anomaly detection may also be used to detect anomalies in a signal. In particular, statistics based anomaly detection often determines a range based on estimated statistics of the signal. For example, the range may correspond to a number of standard deviations away from a mean, and samples outside the range may be identified as anomalies. Compared to amplitude anomaly detection, statistics based anomaly detection may offer several advantages, such being more robust (the detection is less susceptible to noise), and having lower false alarm rates. However, statistics based anomaly detection also has several disadvantages, such as having longer delays and often assumes that the signal distribution has specific characteristics such as being heavily weighted at a centroid.

In some cases, amplitude based anomaly detection algorithms may be used for detection of short anomalies, such as anomalies that include only a single sample or a small number of samples. In other cases, statistics based anomaly detection algorithms may be used for detection of longer anomalies, such as anomalies that include at least a minimum number of samples.

In an example, the signal may not include a trend, or it may be undesirable to estimate a trend in a signal. In this case, steps 222 and 224 may not be performed. In another example, the signal may not include a cyclic pattern, or it may be undesirable to estimate a cyclic pattern in a signal. In this case, steps 226 and 228 may not be performed.

Figure 3:
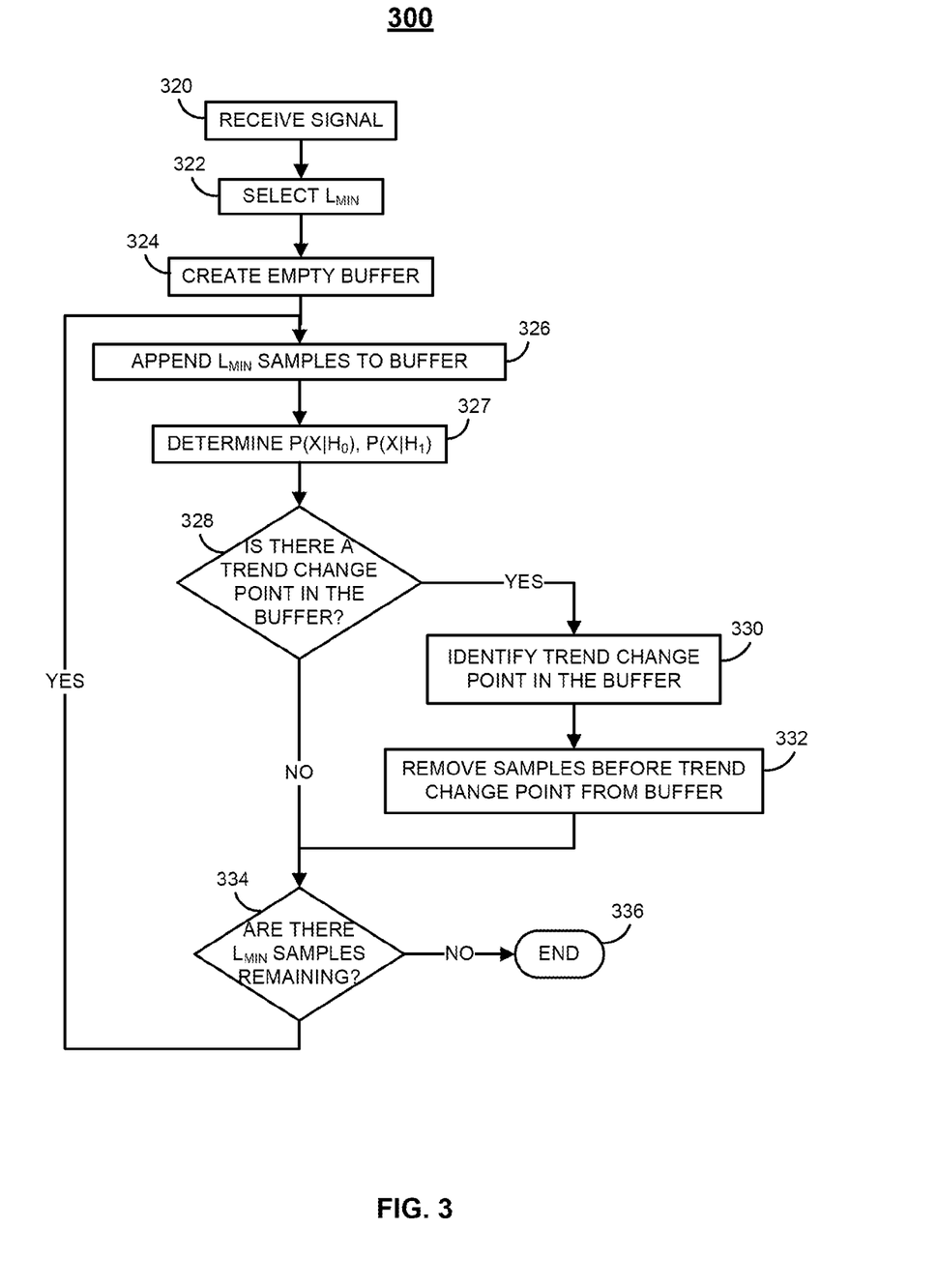
FIG. 3 is a flow chart of one illustrative method for identifying a linear trend in a signal.

FIG. 3 is a flow chart of one illustrative method 300 used by the processor 106 for identifying a linear trend in a signal. To identify a linear trend, linear regression may be performed on a set of samples. In addition, the linear trend may change between various subsets of consecutive samples of the signal (e.g., the slope and/or the y-intercept of the linear function may change). Thus, identifying the samples corresponding to the changes in the linear trend (i.e., trend change points), is useful for identifying the linear trend.

The illustrated method 300 includes the use of Bayesian methods to compute a pair of probabilities of observing a subset of samples in the signal, conditioned on different events: the "$H_0$" event that no sample in the subset is a trend change point, and the "$H_1$" event that one sample in the subset is a trend change point. To compute the probability for the $H_0$ event, the processor 106 may perform a linear regression over the subset of samples. The probability is computed based on a deviation between the linear trend and the observed samples.

To compute the probability for the $H_1$ event, the method 300 may iteratively select each sample in the subset as a "candidate" trend change point. For each candidate trend change point, the processor 106 may perform two linear regressions: one for samples in the subset preceding the candidate trend change point, and one for samples in the subset following the candidate trend change point. Then for each candidate trend change point, the probability of observing the subset of samples in the signal, conditioned on the event that the candidate trend change point is in fact a trend change point, is computed based on a deviation between the two linear trends and the observed samples. The probability for the $H_1$ event then corresponds to the sum of probabilities for each candidate trend change point. Based on a comparison between the computed probabilities for events $H_0$ and $H_1$, the processor 106 determines which event is more likely, and when the event $H_1$ is more likely, the processor 106 identifies the sample in the subset most likely to be a trend change point.

The depicted method 300 begins with the steps of receiving a signal (step 320), selecting a parameter $L_{MIN}$ (step 322), creating an empty buffer (step 324), appending $L_{MIN}$ samples to the buffer (step 326), and determining the probabilities of observing the samples in the buffer, conditioned on the $H_0$ or $H_1$ events (step 327). Upon determining that there is a trend change point in the buffer (decision block 328), the most likely trend change point in the buffer is determined (step 330), and the samples before the determined point are removed (step 332). If there are $L_{MIN}$ samples remaining in the signal (decision block 334), the next $L_{MIN}$ samples are appended to the buffer (step 326). Otherwise, the method ends (step 336).

First, at step 320, the processor 106 receives a signal from the signal source 104. As described in relation to FIG. 1, the signal may be representative of an amount of traffic flow in a network, such as a number of data packets that arrive at a location within a particular time window. In other applications, the signal may be representative of other events or values.

At step 322, the processor 106 selects a parameter $L_{MIN}$. The parameter $L_{MIN}$ corresponds to an integer number of samples in the signal and represents a minimum number of samples in a trend. The processor 106 may select $L_{MIN}$ in a number of ways. In an example, a user provides input to the trend change detector 102, and the processor 106 selects $L_{MIN}$ based on the user input. In this case, the user input may be precisely $L_{MIN}$, or the processor 106 may process the user input to derive an appropriate value for $L_{MIN}$. For example, when the signal is a function of time, the user input may be a length of a time window representative of an expected minimum length of a trend, such as an hour, a day, a week, or any other suitable length of time. The processor 106 would then multiply the user input by the sampling rate of the signal to derive $L_{MIN}$.

The processor 106 may also select $L_{MIN}$ based on known information about the signal or the type of signal. For example, it may be desirable to use a larger $L_{MIN}$ for certain types of signals, such as signals with slow fluctuations corrupted with noise at higher frequencies. In these signals, if the processor 106 were to select a small value for $L_{MIN}$, the noisy and fast fluctuations in the signal may yield trend change points which do not correspond to the slower fluctuations in the signal. In this way, selecting a value for $L_{MIN}$ that is too small may result in over-fitting to the signal. In contrast, it may be desirable to estimate fast changes in the signal, and smaller values for $L_{MIN}$ may be appropriate. In addition, $L_{MIN}$ may be fixed throughout the processing of the signal, or the processor 106 may be configured to use different values for $L_{MIN}$ for different portions of the signal. For example, the value selected for $L_{MIN}$ may be dependent on the values and/or rate of the incoming samples from the signal.

At step 324, the processor 106 creates an empty buffer. An empty buffer may be created by, for example, allocating an appropriate amount of space in the memory unit 108 or initializing a number of variables.

At step 326, the processor 106 appends $L_{MIN}$ samples of the received signal to the buffer. In particular, the $L_{MIN}$ samples correspond to the first $L_{MIN}$ samples in the signal, and the order of these $L_{MIN}$ samples is maintained in the buffer. For example, when an amount of space in the memory unit 108 is allocated for the buffer, locations in the memory unit 108 may be used to store the appended samples to the buffer. Alternatively, the received samples in the signal may already have corresponding storage locations, and these samples may simply be labeled with a flag variable indicating whether the sample is included in the buffer or not.

At step 327, the processor 106 computes a probability $P(X|H_1)$ of observing the samples X in the buffer conditioned on the event that one of the samples in the buffer is a trend change point. The vector X is used herein to represent all N samples in the buffer, such that $X=\{x_1, x_2, \ldots x_N\}$, where $x_i$ corresponds to the $i^{th}$ sample in the buffer. Similarly, the processor 106 also computes a null probability $P(X|H_0)$ of observing all samples in the buffer X conditioned on the event that a trend change point does not exist in the buffer.

The values for probabilities $P(X|H_1)$ and $P(X|H_0)$ may be determined in a number of ways. In an example, one method is a brute force approach that considers multiple possibilities—namely the possibility that each sample in the buffer is a trend change point. The processor 106 may iteratively select each sample $x_i$ in the buffer as a candidate trend change point and computes a probability of observing the samples in the vector X in the buffer conditioned on the event that the candidate trend change point is in fact a trend change point. A value for $P(X|H_1)$ is then computed as the sum of the probabilities corresponding to events in which each sample in the buffer is a candidate trend change point. In addition, a probability $P(X|H_0)$ may be computed by performing a single linear regression across all the samples in the buffer, essentially assuming no trend change point exists in the buffer. However, a number of methods may be suitable for determining appropriate values for $P(X|H_1)$ and $P(X|H_0)$, and any of these alternate methods may be applied with the method 300.

At decision block 328, the processor 106 determines whether there is a trend change point in the buffer based on a relationship between $P(X|H_1)$ and $P(X|H_0)$ computed in step 327. For example, if $P(X|H_1)$ exceeds $P(X|H_0)$, the processor 106 may determine that there is a trend change point in the buffer. In another example, a more stringent condition may be used such as requiring that $P(X|H_1)$ exceeds $P(X|H_0)$ by a threshold amount before determining that there is a trend change point in the buffer. In an example, a condition requires $P(X|H_1)$ to exceed $P(X|H_0)$ by at least 5%, 10%, or any other suitable amount.

If the processor 106 determines that there is a trend change point in the buffer, the processor 106 proceeds to step 330 to identify which point in the buffer is the trend change point. The trend change point may be identified in a number of ways. In an example, the processor 106 may use a Bayesian approach to identify the point most likely to be a trend change point. Using a maximum likelihood calculation, the most likely point is a point calculated to have a maximal probability of observing all samples X in the buffer conditioned on the event that sample $x_i$ is a trend change point.

After identifying the trend change point in the buffer, the samples before the trend change point are removed from the buffer at step 332. These removed samples may be moved to another section of the memory unit 108 or discarded. Alternatively, when a flag variable indicates whether a sample is in the buffer, the flag variables corresponding to removed samples are toggled to represent they are no longer in the buffer. These samples may be removed from the buffer because it may be desirable to have no more than one trend change point in the buffer at any time.

The processor 106 then proceeds to decision block 334, where the processor 106 determines whether there are $L_{MIN}$ samples remaining in the signal that have not yet been processed. In particular, the remaining samples in the signal correspond to those samples that have not yet been included in the buffer. If there are $L_{MIN}$ samples remaining, the method returns to step 326 and appends the next $L_{MIN}$ samples of the signal to the buffer. Otherwise, the method ends at step 336.

The above description describes the use of the method 300 when it is assumed that the long-term changes in the discrete signal are approximately linear. However, any other parametric function may also be used to perform the curve fitting described in relation to the method 300, such as a polynomial function, exponential function, or any other suitable function. In some cases, it may be undesirable to use a parametric function to estimate a trend in a signal. For example, it may be unknown which function or what parameter ranges may be appropriate to describe the trend. In this case, it may be desirable to determine a trend in a signal by decomposition the signal into components, identifying a subset of components as trend components, and constructing a trend by summing the trend components.

Figure 4:
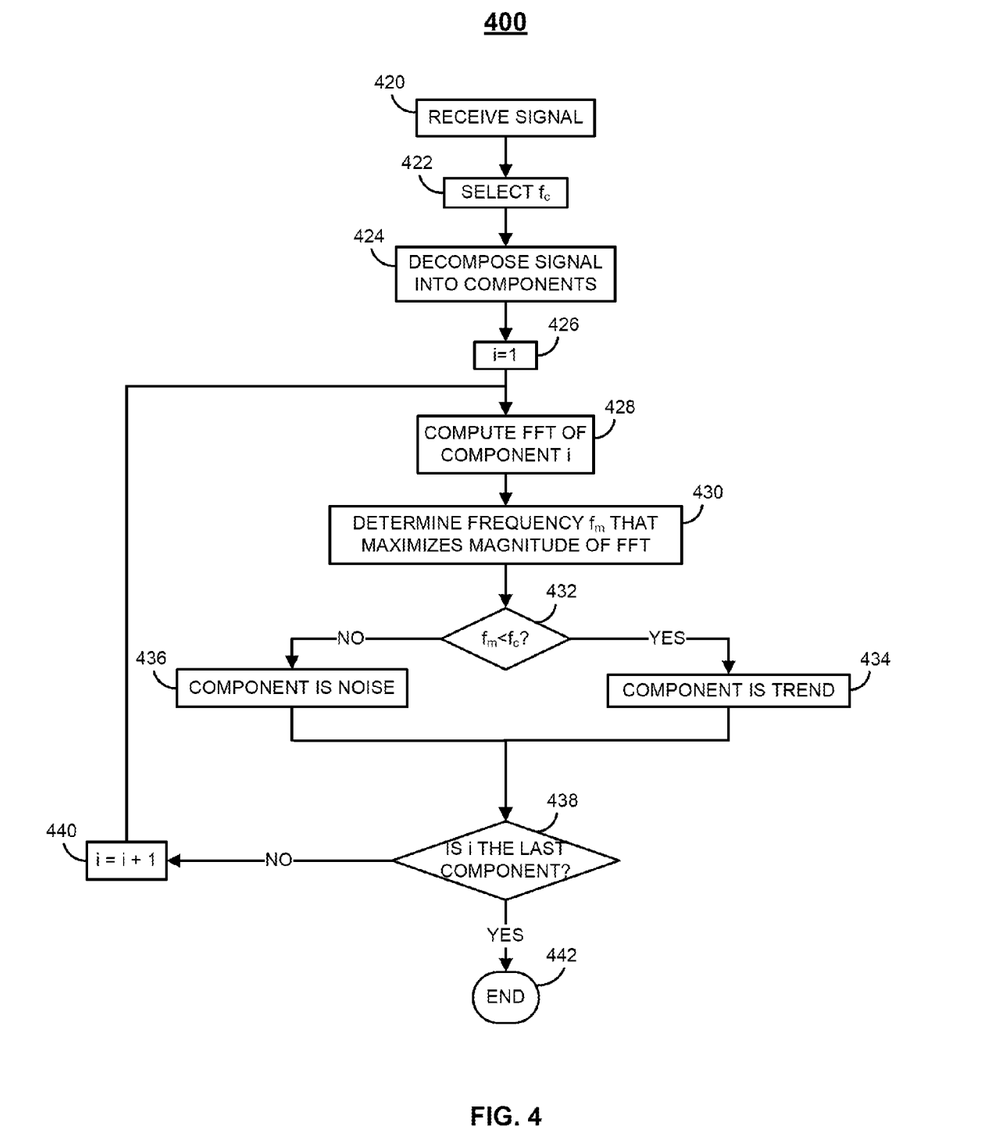
FIG. 4 is a flow chart of one illustrative method for identifying a nonlinear trend in a signal.

FIG. 4 is a flow chart of a method 400 used by the processor 106 for identifying a nonlinear trend in a signal. The method 400 offers advantages over conventional systems for estimating nonlinear trends because it is data-driven (meaning that there are no underlying assumptions on the pattern or distribution of the received signal) and does not require the signal to be stationary or piecewise stationary. Furthermore, a "trend" may have different definitions according to different users, applications, or sets of data. For example, in a signal representing network data over one day, higher traffic during the daytime and lower traffic at night may constitute a trend. However, if the signal represents network data over a longer time period such as a year, a trend may occur over several months, for example.

The method 400 begins with the steps of receiving a signal (step 420), selecting a cut-off frequency parameter $f_c$ (step 422), decomposing the signal into multiple components (step 424), and initializing an iteration parameter i to one (step 426). The Fourier transform of a first component is computed (step 428), and a frequency $f_m$ corresponding to the maximum magnitude of the Fourier transform is determined (step 430). Then, if $f_m$ is less than $f_c$, the first component is categorized as a trend component (step 434). Otherwise, the first component is categorized as a noise component (step 436). The steps 428-436 are repeated until all components have been considered and are categorized as either trend or noise components, and the method ends (step 442).

First, at step 420, the processor 106 receives a signal from the signal source 104. As described in relation to FIG. 1, the signal may be representative of an amount of traffic flow in a network, such as a number of data packets that arrive at a location within a particular time window.

At step 422, the processor 106 selects a cut-off frequency parameter $f_c$. The parameter $f_c$ corresponds to a threshold frequency value for identifying trend components and noise components in the signal. In particular, the signal may be subdivided into multiple signal components, and each signal component may be identified as a trend component or a noise component based on a comparison between a frequency in the signal component and the cut-off frequency $f_c$. The frequency in the signal component may be selected to be a frequency with a maximum magnitude in a frequency representation of the signal component. In this case, the frequency in the signal component may be a primary or a fundamental frequency of the signal component. For example, if the frequency in the signal component is below $f_c$, the signal component may be identified as a trend component; otherwise, the signal component may be identified as a noise component.

The processor 106 may select the cut-off frequency $f_c$ in a number of ways. In an example, a user provides input to the nonlinear trend estimator 102, and the processor 106 selects $f_c$ based on the user input. In this case, the user input may be precisely $f_c$, or the processor 106 may process the user input to derive an appropriate value for $f_c$. For example, the user input may include some information about the signal, such as expected primary frequency components that should be included in the final trend estimate. Thus, the processor 106 may select an appropriate value for $f_c$ by selecting a frequency above the range of frequencies specified by the user. In some examples, it may be desirable to use different values of $f_c$ for different types of signals, such as lower $f_c$ for signals with slow variations and higher $f_c$ for signals with faster variations. This information may be supplied by a user or determined separately by the processor 106. Any suitable method of determining a cut-off frequency $f_c$ may be used.

At step 424, the signal is decomposed into multiple signal components. This signal decomposition can occur in a number of ways. In an example, empirical mode decomposition may be used, which breaks the signal down into signal components in the time domain. Because the analysis is performed in the time-domain, instantaneous frequency changes in the signal and phase information are preserved. In addition, temporal features, such as points in time at which certain changes to the signal occur, are also preserved. Each signal component has the same length as the signal, and the superposition of all the signal components results in the signal. However, any suitable method of decomposing a signal, such as Fourier transforms and wavelet decomposition methods, may also be used.

At step 426, an iteration parameter i is initialized to one, and at step 428, a Fourier transform of the $i^{th}$ signal component is computed. The Fourier transform may be computed using known techniques such as the Fast Fourier Transform (FFT). The FFT transforms the signal component in the time domain to a representation in a frequency domain by providing a sequence of complex values, each representative of a magnitude and phase of a different frequency component in the signal component. In addition, the $i^{th}$ signal component may be processed (e.g., by filtering or any other sort of processing) before and/or after the Fourier transform is computed. Any suitable transform may be computed (e.g., wavelet transforms or any other transform).

At step 430, the processor 106 determines the frequency $f_m$ that corresponds to a frequency component with maximum magnitude in the Fourier transform. The frequency $f_m$ represents a primary or fundamental frequency component in the signal component. For example, the frequency $f_m$ can be the global maximum or a local maximum. In another example, the frequency $f_m$ may be required to satisfy some criteria, such as the maximum frequency within a range of frequencies. In some signal components, there may be more than one frequency component with the same maximal magnitude. In this case, the processor 106 may select as $f_m$ the component with the lowest frequency, another component, or may perform some processing on the components such as taking the average.

At decision block 432, the processor 106 compares $f_m$ and $f_c$ to determine whether $f_c$ exceeds $f_m$. In an example, the decision block 432 may include a more stringent condition such as requiring that $f_c$ exceed $f_m$ by a threshold amount before determining that $f_c$ sufficiently exceeds $f_m$. The frequency $f_m$ represents a primary frequency in the signal component, and the processor 106 identifies a signal component as trend or noise based on its primary frequency. Because a trend of a signal corresponds to long-term fluctuations in the signal, identifying the trend may require removing high frequency portions of the signal. By sorting each signal component into trend and noise categories, the processor 106 selects signal components including primarily low frequencies as trend components and signal components including primarily high frequencies as noise components.

At step 434, upon determining that $f_c$ exceeds $f_m$ (or some other criteria is satisfied by the relationship between $f_c$ and $f_m$), the processor 106 identifies or categorizes the $i^{th}$ signal component as a trend component. Thus, signal components with primary frequency components that are less than the cut-off frequency $f_c$ are categorized as trend components. As an example, this categorization may be performed by setting a flag parameter corresponding to the $i^{th}$ component to a value indicative of a trend component.

At 436, upon determining that $f_m$ exceeds $f_c$ (or some other criteria is satisfied by the relationship between $f_c$ and $f_m$), the processor 106 categorizes the $i^{th}$ signal component as a noise component.

At decision block 438, the processor 106 determines whether the $i^{th}$ is the last component. If not, the iteration parameter i is incremented, and the processor 106 repeats steps 428-438. Otherwise, when all signal components have been considered, the method ends at step 442.

The method 400 illustrates parsing the signal components in a particular order. For example, when the signal is decomposed using empirical mode decomposition at step 424, the value of the iteration parameter i may correspond to the $i^{th}$ signal component. However, any order of the signal components may be used, such as a reverse order or a random order.

Furthermore, in some embodiments, not every signal component is examined using steps 428-436. For example, when empirical mode decomposition is used to decompose the signal into multiple signal components at step 424, the last signal component is typically not zero mean, and may sometimes be automatically categorized as trend.

In some embodiments, a metric may be used to assess the confidence of a category. This confidence metric may be useful for determining which categories are more certain to be accurate than others. For example, for a signal component for which $f_m$ greatly exceeds $f_c$, a metric indicating a high confidence may be assigned indicating that the signal component is noise, compared to another signal component for which $f_m$ barely exceeds $f_c$. In addition, signal components corresponding to low confidence (i.e., signal components for which $f_m$ is within some threshold range near $f_c$) may be categorized as neither trend nor noise.

In some embodiments, the processor 106 may not select a value for $f_c$ prior to performing the signal decomposition at step 424. For example, the signal may first be decomposed such that a primary frequency of each signal component may be determined before selecting a value for $f_c$. In this case, the value for $f_c$ may be determined based on the set of primary frequencies. For example, it may be desirable to identify only a fixed number (e.g., 3) of signal components as trend, such that $f_c$ may be appropriately chosen to be between the two primary frequencies (e.g., corresponding to the signal components with the third and fourth lowest primary frequencies). In this case, the processor 106 ensures that only the fixed number of signal components are categorized as trend.

Figure 5:
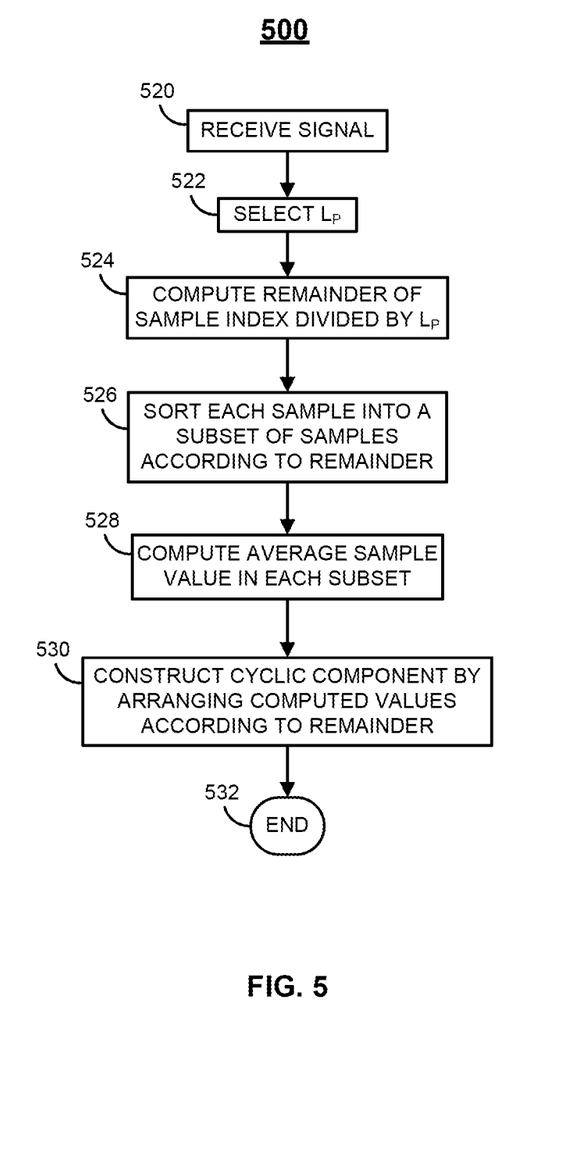
FIG. 5 is a flow chart of one illustrative method for identifying a cyclic pattern in a signal.

FIG. 5 is a flow chart of a method 500 used by the processor 106 for identifying a cyclic pattern in a signal. After removing a long-term trend (such as a trend identified by methods 300 or 400) from a signal, obtaining a detrended signal (i.e., step 224 in the method 200), the method 500 may be used by the processor 106 to determine a cyclic pattern in the detrended signal. In particular, cyclic pattern detection on a detrended signal is likely to be more robust than performing cyclic pattern detection on a raw signal. This is because long-term changes in the signal (such as slow increases or decreases) add variance to each estimated value in the cyclic pattern, as will become apparent in the description below. In particular, the method 500 groups equally spaced samples of the signal together, where the size of the equal spacing corresponds to a period of the cyclic pattern. An aggregate value is computed for each group, such as an average value, and the average values are placed in an order to derive the cyclic pattern.

The method 500 begins with the steps of receiving a signal (step 520) and selecting a parameter $L_P$ (step 522) corresponding to an integer number of samples representative of a period of the cyclic pattern. Then for each sample in the signal, a remainder value is computed by dividing the sample index by $L_P$ (step 524). Then each sample is sorted into a subset of samples according to the remainder value (step 526), an average sample value is computed for each subset of samples (step 528), and a cyclic component is constructed by arranging the computed values based on the corresponding the remainder values (step 530). As is described below, the signal's cyclic pattern may include one or more cyclic components.

At step 520, the processor 106 receives a signal. As described in relation to FIG. 1, the signal may be representative of an amount of traffic flow in a network, such as a number of data packets that arrive at a location within a particular time window. In particular, the signal may be a detrended signal, or alternatively, may be a raw signal.

At step 522, a parameter $L_P$ corresponding to an integer number of samples is selected. The integer $L_P$ corresponds to a length of a period of the cyclic pattern and may be provided to the processor 106 via user input. For example, a cyclic pattern may have different definitions according to different users, applications, or sets of data. In particular, some users may be interested in performing anomaly detection in a signal indicative of network data. Depending on the time scale of interest to the user (i.e., daily, weekly, seasonally, or any other suitable time period), different values for $L_P$ may be selected. In addition, the processor 106 may be configured to process the user input to derive an appropriate value for $L_P$. For example, rather than providing an integer number of samples, the user may provide a length of time (i.e., an hour, a day, a week, or any other suitable length of time). The processor 106 may multiply the provided length of time by the sampling frequency of the signal to derive an appropriate integer value for a number of samples in a period of a cyclic pattern ($L_P$).

At step 524, a remainder value is computed for each sample by dividing the sample index by the integer $L_P$. In particular, each sample in the signal has a corresponding sample index number, which is a unique integer assigned to each sample and dictates the ordering of the samples in the signal. For example, a 100 second long signal may include 500 samples sampled at 5 Hz. The sample indices may include the values 1 to 500, 0 to 499, or any other suitable sequence of sample indices. For each sample, the sample index is divided by the length of the cyclic pattern $L_P$ to derive a remainder value. The modulo operator may be used to compute the remainder value. As an example, for 500 samples with indices 1-500, if $L_P$=10 (or two seconds for a signal sampled at 5 Hz), this means there are M=50 "periods" in the 500 samples (in other words, there are 50 two-second intervals in 100 seconds). Then, samples with index values 10×n+1 (where n is an integer) will each have remainder value 1. Similarly, samples 10×n+2 each have remainder value 2. In general, samples $L_P$×n+j (where n is an integer from 0 to M−1, and j is an integer from 0 to $L_P$−1) all have the same remainder values corresponding to j.

At step 526, each sample is sorted into a subset of samples according to the sample's remainder value. In particular, in the example described above, out of the 500 samples, M=50 samples will have the same remainder value, and are sorted into the same subset. The number of subsets equals the number of possible remainder values, or $L_P$, and each subset is thus associated with a remainder value (i.e., j=0, 1, 2 . . . $L_P$−1).

At step 528, an average value is computed for each subset of samples. In particular, for each subset, the mean of the sample values in the subset may be computed. Alternatively, the median (or any other suitable metric) of the subset may be computed.

At step 530, a cyclic component is constructed by arranging (or ordering) the computed values according to their corresponding remainder values. Since there are $L_P$ subsets, there are $L_P$ average values, and the average values are arranged in order of increasing remainder values. In an example, the average value for a subset corresponding to remainder 0 may be placed first (i.e., as the first value of the cyclic pattern). This value may be followed by the average value for a subset corresponding to remainder 1 (i.e., as the second value of the cyclic pattern), and so on. Thus, one period of the cyclic component is formed when the set of $L_P$ average values are appropriately ordered. In addition, the set of $L_P$ average values may be repeated and appended to the set as many times as is desirable to form multiple periods of the cyclic component.

In addition, the processor 106 may identify multiple cyclic components at different time scales by repeating the steps in the method 500 for different values of $L_P$. In particular, a cyclic pattern of the signal may include multiple cyclic components, where each cyclic component corresponds to a result of the method 500 for a single $L_P$ value. A cyclic pattern of the signal may be a superposition of multiple cyclic components for different $L_P$ values.

In an example, different cyclic components may be identified from the signal, and the processor 106 may compute an error metric indicative of a deviation of the set of samples in the signal to the average computed values. In particular, $L_P$ error values may be computed, one for each subset of samples, and representative of a deviation of the subset of samples from the computed average value for the subset. Computing an error value for a subset of samples may use any number of suitable processes for computing error. The $L_P$ error values may be combined (i.e., by adding or any other suitable method of combining values) to derive an aggregate error, representative of an overall deviation of the samples in the signal to the determined cyclic pattern. Thus, an aggregate error value may be computed for each of a number of values for the period $L_P$, and the cyclic pattern may include cyclic components for certain values for $L_P$ based on the aggregate error value. For example, the cyclic pattern for the signal may be identified by selecting the cyclic component with the smallest aggregate error value. This may be appropriate if it is desirable to have the cyclic pattern of the signal represent a single cyclic component, and therefore a single period. In another example, the processor 106 may perform thresholding on the aggregate error values for different $L_P$ values. In particular, the cyclic pattern of a signal may be identified by selecting the cyclic components with aggregate error values below a predetermined threshold.

In an example, if it is desirable to compute multiple cyclic components with different periods of a signal, any previously determined cyclic component may be first subtracted from the signal before determining any additional cyclic component. For example, the processor 106 may subtract one or more cyclical components corresponding to longer time scales (large $L_P$) before using the method 500 to identify cyclical components at shorter time scales (small $L_P$). Additionally, the processor 106 may use an aggregate error value computed for a particular $L_P$ value as described above to determine whether the corresponding cyclic component should be included in the signal cyclic pattern and/or subtracted from the signal before identifying other cyclic components.

The identified signal cyclic pattern (which may include any number of cyclical components at different periods) is then subtracted from the signal, resulting in a residual signal. The residual signal is essentially free of trends (long-term fluctuations) and cyclical patterns (periodic sequences) and may be modeled as a stationary process. In particular, anomaly detection performed on the residual signal is more robust than performing anomaly detection on the original signal. The trend component and the cyclic pattern of the signal may interfere with detection of anomalies, so identification and removal of these portions of the signal results in better performance.

Figure 6:
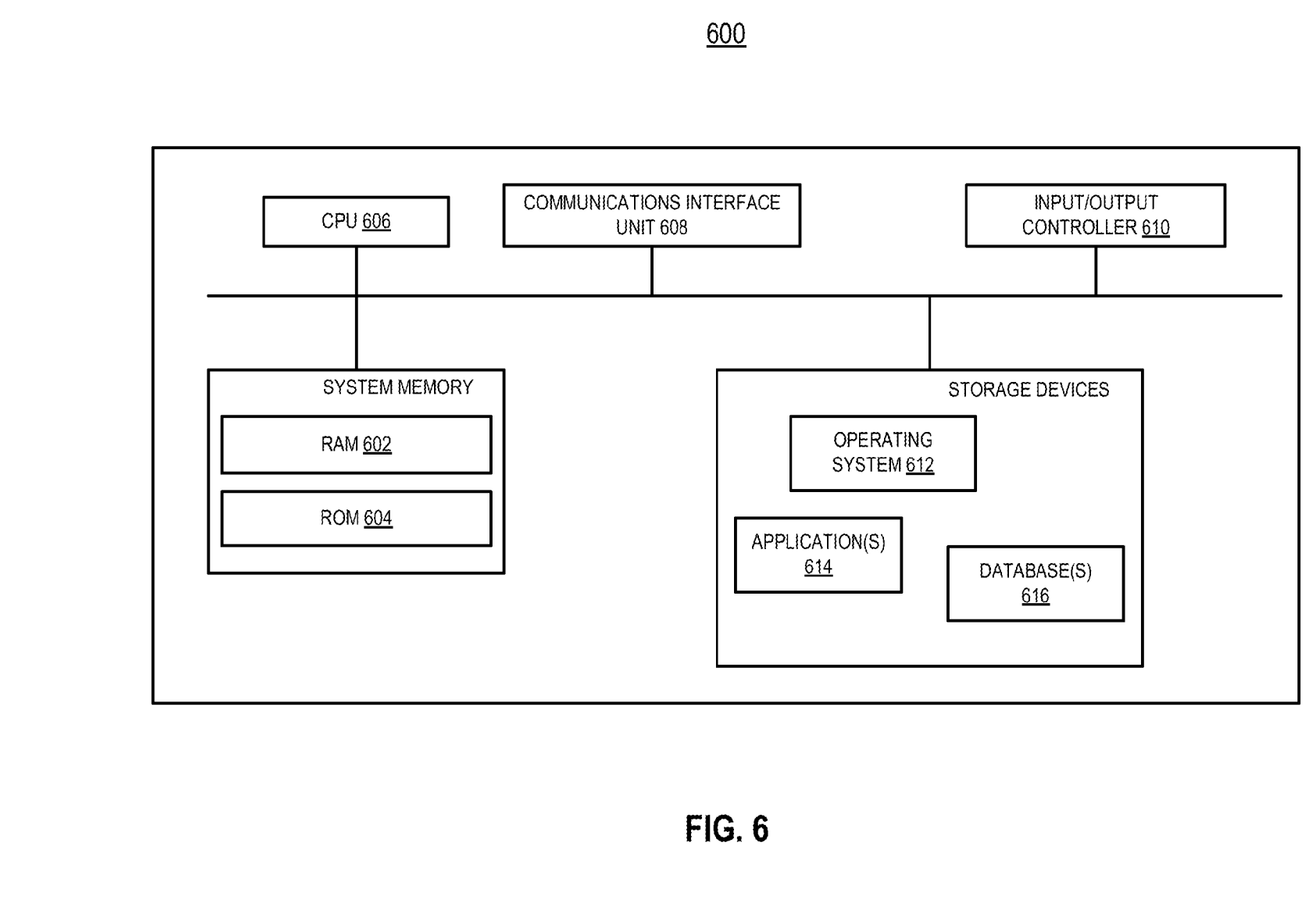
FIG. 6 is a block diagram of a computing device for performing any of the processes described herein.

FIG. 6 is a block diagram of a computing device, such as any of the components of the system of FIG. 1, for performing any of the processes described herein. Each of the components of these systems may be implemented on one or more computing devices 600. In certain aspects, a plurality of the components of these systems may be included within one computing device 600. In certain implementations, a component and a storage device may be implemented across several computing devices 600.

The computing device 600 comprises at least one communications interface unit, an input/output controller 610, system memory, and one or more data storage devices. The system memory includes at least one random access memory (RAM 602) and at least one read-only memory (ROM 604). All of these elements are in communication with a central processing unit (CPU 606) to facilitate the operation of the computing device 600. The computing device 600 may be configured in many different ways. For example, the computing device 600 may be a conventional standalone computer or alternatively, the functions of computing device 600 may be distributed across multiple computer systems and architectures. In FIG. 6, the computing device 600 is linked, via network or local network, to other servers or systems.

The computing device 600 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 608 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 606 comprises a processor, such as one or more conventional microprocessors and one or more supplementary co-processors such as math co-processors for offloading workload from the CPU 606. The CPU 606 is in communication with the communications interface unit 608 and the input/output controller 610, through which the CPU 606 communicates with other devices such as other servers, user terminals, or devices. The communications interface unit 608 and the input/output controller 610 may include multiple communication channels for simultaneous communication with, for example, other processors, servers or client terminals.

The CPU 606 is also in communication with the data storage device. The data storage device may comprise an appropriate combination of magnetic, optical or semiconductor memory, and may include, for example, RAM 602, ROM 604, flash drive, an optical disc such as a compact disc or a hard disk or drive. The CPU 606 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 606 may be connected to the data storage device via the communications interface unit 608. The CPU 606 may be configured to perform one or more particular processing functions.

The data storage device may store, for example, (i) an operating system 612 for the computing device 600; (ii) one or more applications 614 (e.g., computer program code or a computer program product) adapted to direct the CPU 606 in accordance with the systems and methods described here, and particularly in accordance with the processes described in detail with regard to the CPU 606; or (iii) database(s) 616 adapted to store information that may be utilized to store information required by the program.

The operating system 612 and applications 614 may be stored, for example, in a compressed, an uncompiled and an encrypted format, and may include computer program code. The instructions of the program may be read into a main memory of the processor from a computer-readable medium other than the data storage device, such as from the ROM 604 or from the RAM 602. While execution of sequences of instructions in the program causes the CPU 606 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to detecting an anomaly in a signal as described herein. The program also may include program elements such as an operating system 612, a database management system and "device drivers" that allow the processor to interface with computer peripheral devices (e.g., a video display, a keyboard, a computer mouse, etc.) via the input/output controller 610.

The term "computer-readable medium" as used herein refers to any non-transitory medium that provides or participates in providing instructions to the processor of the computing device 600 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 606 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 600 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

The invention claimed is:

1. A method for detecting anomalies in a discrete signal from network traffic flow comprising:
   receiving, by an anomaly detector including one or more processors, a network traffic signal comprising discretized samples corresponding to data packets arriving at a network node within a sampled time interval;
   identifying, by the anomaly detector, a trend component of the network traffic signal, the trend component corresponding to frequency components of the network traffic signal below a first cut-off frequency threshold
   calculating, by the anomaly detector, a detrended network traffic signal based on the trend component and the network traffic signal;
   identifying, by the anomaly detector, a cyclic component in the detrended network traffic signal, the cyclic component corresponding to frequency components of the detrended network traffic signal above a second cut-off frequency, the second cut-off frequency greater than the first cut-off frequency;
   calculating, by the anomaly detector, a residual network traffic signal based on the cyclic component and the detrended network traffic signal;
   detecting, by the anomaly detector, an anomaly in the residual network traffic signal based on at least one of an amplitude-based anomaly detection algorithm or a statistics-based anomaly detection algorithm; and
   reconfiguring, by the anomaly detector, a network comprising the network node responsive to detecting the anomaly.

2. The method of claim 1, wherein the anomaly corresponds to an amount of data flow larger than a threshold.

3. The method of claim 1, wherein detecting the anomaly comprises detecting the anomaly based on the statistics-based anomaly detection algorithm, comprising:
   identifying a characteristic range of a plurality of samples in the residual network traffic signal, wherein at least a subset of the plurality of samples in the residual network traffic signal are within the characteristic range; and
   identifying a sample point in the residual network traffic signal outside the characteristic range as the anomaly.

4. The method of claim 1, wherein detecting the anomaly comprises detecting the anomaly by based on the amplitude-based anomaly detection algorithm, comprising:
   generating a historical probability distribution of the residual network traffic signal based on previously received network traffic signal samples;
   computing a likelihood for each sample point in the residual network traffic signal based at least in part on the historical probability distribution;
   selecting a likelihood threshold; and
   identifying a set of consecutive sample points as the anomaly, wherein each sample point in the set of consecutive sample points has a computed likelihood below the likelihood threshold.

5. The method of claim 1, wherein identifying the trend component of the network traffic signal comprises:
   selecting a parameter L, wherein L corresponds to a minimum number of sample points in a linear trend;
   appending L consecutive sample points of the network traffic signal to a buffer;
   fitting a first curve to sample points in the buffer preceding a sample point in the buffer;
   fitting a second curve to sample points in the buffer following the sample point;
   computing a probability that a sample point of the sample points is a trend change point based on a deviation between the sample points in the buffer and the fitted first and second curves;
   determining that there is a trend change point in the buffer based at least in part on the computed probability; and
   identifying the sample point in the buffer as the trend change point based at least in part on the computed probability.

6. The method of claim 1, wherein identifying the trend component of the network traffic signal comprises:
   subdividing the network traffic signal into a plurality of signal components, wherein each signal component of the plurality of signal components correspond to a range of frequencies;
   selecting a cut-off frequency for identifying a non-linear trend component in the network traffic signal;
   identifying a signal component, for each of the plurality of signal components, as the trend subcomponent based on a comparison between the cut-off frequency and an identified frequency associated with the signal component; and determining the trend component based at least in part on a sum of identified trend subcomponents.

7. The method of claim 1, wherein identifying the cyclic component in the detrended network traffic signal comprises:

selecting a period of the cyclic component;

identifying an index for each sample point in a plurality of sample points in the network traffic signal;

forming a plurality of subsets of sample points, wherein each subset of sample points is associated with a respective remainder value less than the period of the cyclic component;

sorting each sample point in the plurality of sample points to one of the subsets based on a remainder of the index of the respective sample point divided by the period;

computing, for each subset of sample points, a value associated with the respective subset; and determining the cyclic component by ordering the computed values according to the associated remainder values.

8. The method of claim 1, wherein reconfiguring the network comprising the network node comprises altering a size of a buffer at the network node.

9. The method of claim 1, wherein reconfiguring the network comprising the network node comprises replacing a first buffer at the network node with a second buffer at the network node, a size of the second buffer greater than a size of the first buffer.

10. An apparatus for detecting anomalies in a discrete signal from network traffic flow, comprising:

a non-transitory memory;

a processor for:

receiving a network traffic signal comprising discretized samples corresponding to data packets arriving at a network node within a sampled time interval;

identifying a trend component of the network traffic signal, the trend component corresponding to frequency components of the network traffic signal below a first cut-off frequency threshold;

calculating a detrended network traffic signal based on the trend component and the network traffic signal;

identifying a cyclic component in the detrended network traffic signal, the cyclic component corresponding to frequency components of the detrended network traffic signal above a second cut-off frequency, the second cut-off frequency greater than the first cut-off frequency;

calculating, by the anomaly detector, a residual network traffic signal based on the cyclic component and the detrended network traffic signal;

detecting an anomaly in the residual network traffic signal based on at least one of an amplitude-based anomaly detection algorithm or a statistics-based anomaly detection algorithm; and reconfiguring, by the anomaly detector, a network comprising the network node responsive to detecting the anomaly.

11. The apparatus of claim 10, wherein the anomaly corresponds to an amount of data flow larger than a threshold.

12. The apparatus of claim 10, wherein detecting the anomaly comprises detecting the anomaly based on the statistics-based anomaly detection algorithm, comprising:

identifying a characteristic range of a plurality of samples in the residual network traffic signal, wherein at least a subset of the plurality of samples in the residual network traffic signal are within the characteristic range; and identifying a sample point in the residual network traffic signal outside the characteristic range as the anomaly.

13. The apparatus of claim 10, wherein detecting the anomaly comprises detecting the anomaly by based on the amplitude-based anomaly detection algorithm, comprising:

generating a historical probability distribution of the residual network traffic signal based on previously received network traffic signal samples;

computing a likelihood for each sample point in the residual network traffic signal based at least in part on the historical probability distribution;

selecting a likelihood threshold; and identifying a set of consecutive sample points as the anomaly, wherein each sample point in the set of consecutive sample points has a computed likelihood below the likelihood threshold.

14. The apparatus of claim 10, wherein identifying the trend component of the network traffic signal comprises:

selecting a parameter L, wherein L corresponds to a minimum number of sample points in a linear trend;

appending L consecutive sample points of the network traffic signal to a buffer;

fitting a first curve to sample points in the buffer preceding a sample point in the buffer;

fitting a second curve to sample points in the buffer following the sample point;

computing a probability that a sample point of the sample points is a trend change point based on a deviation between the sample points in the buffer and the fitted first and second curves;

determining that there is a trend change point in the buffer based at least in part on the computed probability; and identifying the sample point in the buffer as the trend change point based at least in part on the computed probability.

15. The apparatus of claim 10, wherein identifying the trend component of the network traffic signal comprises:

subdividing the network traffic signal into a plurality of signal components, wherein each signal component of the plurality of signal components correspond to a range of frequencies;

selecting a cut-off frequency for identifying a non-linear trend component in the network traffic signal;

identifying a signal component, for each of the plurality of signal components, as the trend subcomponent based on a comparison between the cut-off frequency and an identified frequency associated with the signal component; and determining the trend component based at least in part on a sum of identified trend subcomponents.

16. The apparatus of claim 10, wherein identifying the cyclic component in the detrended network traffic signal comprises:

selecting a period of the cyclic component;

identifying an index for each sample point in a plurality of sample points in the network traffic signal;

forming a plurality of subsets of sample points, wherein each subset of sample points is associated with a respective remainder value less than the period of the cyclic component;

sorting each sample point in the plurality of sample points to one of the subsets based on a remainder of the index of the respective sample point divided by the period;
computing, for each subset of sample points, a value associated with the respective subset; and
determining the cyclic component by ordering the computed values according to the associated remainder values.

17. The apparatus of claim 10, wherein reconfiguring the network comprising the network node comprises altering a size of a buffer at the network node.

18. The apparatus of claim 10, wherein reconfiguring the network comprising the network node comprises replacing a first buffer at the network node with a second buffer at the network node, a size of the second buffer greater than a size of the first buffer.

* * * * *